March 7, 1944.  L. GLASS  2,343,408

LAMINATED FABRIC

Filed Feb. 25, 1942

INVENTOR.
LOUIS GLASS.
BY
ATTORNEYS

Patented Mar. 7, 1944

2,343,408

UNITED STATES PATENT OFFICE 2,343,408

LAMINATED FABRIC

Louis Glass, Kew Gardens, N. Y., assignor to Celanese Corporation of America, a corporation of Delaware No Drawing. Application February 25, 1942, Serial No. 432,257

2 Claims. (Cl. 154—46)

This invention relates to the preparation of laminated fabrics and to wearing apparel and other technical or commercial articles formed in whole or in part from such laminated fabrics, and relates more particularly to the preparation of laminated fabrics that are water- and moisture-proof.

An object of my invention is the preparation of a laminated fabric that is water- and moisture-proof, that does not lose the original flexibility of its component fabric layers and of which at least the outer layers retain their fabric-texture appearance.

Another object of my invention is the provision of an improved water- and moisture-proof laminated fabric structure suitable for use as sweat bands for hats.

Other objects of my invention will appear from the following detailed description.

While water- and moisture-proof laminated fabrics prepared in accordance with this invention are applicable to many textile and commercial uses, such as, for example, in belts, suspenders, garters, sweat bands for hats, and, in fact, in all articles where water- and moisture-proof characteristics are desired in the finished product, they find their best use as sweat bands for hats and, accordingly, this invention will be more particularly described in connection therewith.

In my co-pending application, Serial No. 404,863, filed July 31, 1941, I have described the preparation of a novel sweat band for hats from a plurality of fabric layers, at least one of which is made of or contains a thermoplastic material in the form of filamentary materials, such as yarns, filaments or fibers, or in the form of a coating on a fabric of a powder applied to a fabric or fabrics before the laminating step, without the necessity for folding or otherwise shaping the fabric layers of fabric to the desired shape in the final assembly.

In accordance with the process described in the above-mentioned co-pending application, a fabric is cut on the bias and is then folded along its long edges to form a flat, rectangular envelope-like structure having parallel sides. Within the folds of this envelope-like structure is positioned a layer of fabric of substantially the same length as said envelope-like structure and having the curved shape desired in the final product, causing the edges of the envelope-like structure to assume the curvature of the inner layer. Heat and pressure are then applied to the laminae causing the same to unite and set the laminated structure in the configuration of the inner layer. Thus, while the outer bias-cut fabric may originally be folded along a straight line, by inserting an inner layer of fabric having a curved shape into the folds of the bias-cut fabric, the latter adjusts itself to the shape of the inner fabric and, upon treatment of the assembled fabrics under heat and pressure there results a laminated fabric having the same curved shape as the inner layer. In accordance with this process the preparation of shaped laminated fabrics is greatly simplified since the outer fabrics may be folded along a straight line by the use of simple guides and pressing means, such as calender rolls, and the need for complicated machinery to fold the fabric along a curve so that the final stiffened fabric will be curved, is thus wholly eliminated.

According to the process of my co-pending application, laminated fabrics of any degree of stiffness may be obtained depending upon the nature of the fabrics employed and the manner in which they are laminated. Preferably, there is employed an outer fabric which is made in whole or in part of yarns of a thermoplastic material such as cellulose acetate or other organic derivative of cellulose, and unite said fabric with a shaped inner layer which contains a plasticizer for the thermoplastic material contained in the outer fabric. The shaped inner layer containing the plasticizer may itself be made of or contain yarns of a thermoplastic material or it may be made of yarns of a non-thermoplastic material such as, for example, cotton, regenerated cellulose, linen, wool or natural silk. Where the inner layer is made wholly of yarns of a non-thermoplastic material it may be coated or otherwise treated so as to have incorporated or associated therewith a thermoplastic material. By employing an inner layer containing a plasticizer for the thermoplastic yarns of the outer layers and avoiding the use of a plasticizer in the outer layer of fabrics, the original fabric structure and the original appearance of the outer or exposed layers may be maintained and coalescence of the filaments or yarns thereof avoided upon the subsequent application of heat and pressure to unite the several layers. If desired, the outer, bias-cut fabric may likewise be made of yarns of non-thermoplastic materials and may be laminated by employing a shaped inner layer made of or containing thermoplastic material or an inner layer of non-thermoplastic yarns which is coated or has otherwise associated therewith a thermoplastic material, as heretofore described.

Where the outer fabric or inner layer is only in part composed of yarns of a thermoplastic material, such as cellulose acetate, the yarns may alternate either in the warp or in the weft or both, in any desired degree of alternation with yarns of non-thermoplastic materials. This alternation may be, for example, 1, 2, 3 or more cellulose acetate yarns with 1, 2, 3 or more yarns of cotton or other non-thermoplastic material. Conveniently, the warp may be made with such alternations of cellulose acetate yarn and yarns of other materials, while the weft may consist wholly of cellulose acetate yarn or wholly of yarns of non-thermoplastic materials. If desired, a fabric may be employed in which either the warp or weft consists wholly of cellulose acetate yarn while the other component consists of non-thermoplastic yarn. The fabrics may also be composed of yarns spun from mixed fibers wherein some of the fibers are of a thermoplastic material while the remainder are of non-thermoplastic materials.

The fabrics, after being assembled by interposing the plasticized inner layer between the folds of the outer fabric, may then be united by the application of heat and pressure. This may be done by any suitable device, for instance, by hot ironing or by passing between pressure rolls one or both of which are heated, or between a heated roller and a heated or cold plate or surface. Preferably there is employed a pressing device comprising two flat heated surfaces one of which is padded so as to be slightly yielding. The heating device may be heated to the desired temperatures, for example, 80° C. to 180° C. or more by any suitable heating medium and the pressure applied may be any desired pressure, say, from 10 to 600 pounds per square inch. In some instances it is desirable that water be present during the application of heat and pressure. The water may be applied in any suitable manner as by dipping, spraying, brushing or padding the assembled fabrics. After the fabric assembly has been wetted, heat and pressure may then be applied.

The layers of the composite fabric may be joined together and the assembly stiffened without a visible alteration of the exposed layers of fabric that contain organic derivatives of cellulose. While the plasticizer which has been incorporated in or applied to the backing or inner layers of fabric of the composited article in any suitable manner is sufficient to cause a flow or softening of the organic derivatives of cellulose on the inner sides of the outer layers of the fabric, the action is not carried through the exposed layers of the fabric to the outer surface thereof to alter the appearance or hand of the exposed part. Thus, the texture and hand of the exposed surface or surfaces of the composite fabric will be unaltered and may be the same as an unstiffened and/or unadhering fabric layer.

Any suitable plasticizer may be employed in the inner layer, which plasticizer may or may not be soluble in water. The plasticizers may be any of the high-boiling solvents or softening agents as, for example, the aryl sulphonamides such as para-ethyl-toluene sulphonamide, the alkyl phthalates such as dimethyl phthalate, the dialkyl tartrates such as dibutyl tartrate, the alkoxy esters of polybasic organic acids such as diethoxy-ethyl-phthalate, the polybasic acid esters of the mono alkyl ethers of polyhydric alcohols such as diethylene-glycol ethyl-ether ester of phthalic acid, the alkyl esters of phosphoric acid such as triethylglycol phosphate, the mixed alkyl and aryl phosphates, and camphor.

The amount of plasticizer present is preferably relatively large and on the order of from less than 40% to 150% or more of the weight of the organic derivative of cellulose present in the assembly of fabrics. Where the assembly is to consist of fabrics of an organic derivative of cellulose as the front and back layers and an inner layer of a cotton fabric, the amount of plasticizer applied to the cotton fabric may be as much as the cotton fabric will absorb and retain, i. e. the cotton fabric is saturated with the plasticizer.

The yarns or filaments employed to form the fabric, the coating on the fabric or the powder may be made of any suitable organic derivative of cellulose, for instance, organic esters of cellulose and cellulose ethers. Examples of organic esters of cellulose are cellulose acetate, cellulose propionate, cellulose butyrate, mixed esters such as cellulose acetate-propionate and cellulose acetate-butyrate, while examples of cellulose ethers are ethyl cellulose and benzyl cellulose. Moreover, the organic derivative of cellulose thermoplastic material may be replaced in whole or in part by a suitable thermoplastic resin or by any other suitable adhesive material.

The process above described yields a product which is very satisfactory. Sweat-bands made in accordance therewith have found wide acceptance in the hat trade. It has been found, however, that this sweat-band was not sufficiently moisture-proof for use by persons who perspire excessively. I have, accordingly, prepared an improved sweat-band which is substantially completely water- and moisture-proof so as to permit no moisture (perspiration) to penetrate from the hat side of the band to the body of the hat.

In accordance with the present invention, I treat the outer fabric, either before or after it is formed into its envelope-like structure, with a water-repellent composition comprising an aluminum salt and wax emulsion, e. g. an emulsion comprising aluminum acetate and mineral wax. Such water-repellent compositions are sold under the trade names of Impregnol, Cerol, Aridex, Luposec, Perlof, Ramasit, etc. This emulsion is applied to the outer fabric in any suitable manner as by passing the same through quetch rolls mounted in a bath of said emulsion and then passing over drying cans. I also treat the inner layer of fabric by coating the same prior to its insertion in the envelope of bias-cut fabric by coating the same with a layer of appreciable depth of a thermoplastic material, such as, for example, cellulose acetate or other organic derivative of cellulose. I have found, however, that it is preferable to coat but one side of the inner layer, namely, the side which, in use, will be away from the head of the wearer. The coating on said inner layer of fabric may be applied to the surface thereof by brushing or spraying thereon a solution of cellulose acetate or other organic derivative of cellulose in a solvent therefor, or by smoothing thereon as with a knife or spatula a paste having a basis of cellulose acetate or other organic derivative of cellulose, or by any other suitable means. The coating on the inner layer may contain a plasticizer for the organic derivative of cellulose employed.

The sweat-band formed in accordance with the above outlined process loses substantially none of its flexibility by virtue of the treatments of the outer and inner layers of fabric.

It is to be understood that the foregoing detailed description is merely given by way of illustration and that many variations may be made therein without departing from the spirit of my invention.

Having described my invention, what I desire to secure by Letters Patent is:

1. A sweat-band for a hat comprising an inner layer of fabric coated on one side only with cellulose acetate joined to an outer envelope of fabric having a coating thereon comprising a water-repellent emulsion of an aluminum salt and wax, the coating of cellulose acetate on said inner layer of fabric being on the side away from the head side of the sweat-band.

2. A sweat-band for a hat comprising an inner layer of fabric coated on one side only with a thermoplastic material joined to an outer envelope of fabric having a coating thereon comprising a water-repellent emulsion of an aluminum salt and wax.

LOUIS GLASS.

CERTIFICATE OF CORRECTION.

Patent No. 2,343,408.　　　　　　　　　　　　　　March 7, 1944.

LOUIS GLASS.

It is hereby certified that error appears in the above numbered patent requiring correction as follows: The sheet of drawing shown below should be inserted as a part of the Letters Patent -

March 7, 1944.　　　　　L. GLASS　　　　　2,343,408

LAMINATED FABRIC

Filed Feb. 25, 1942

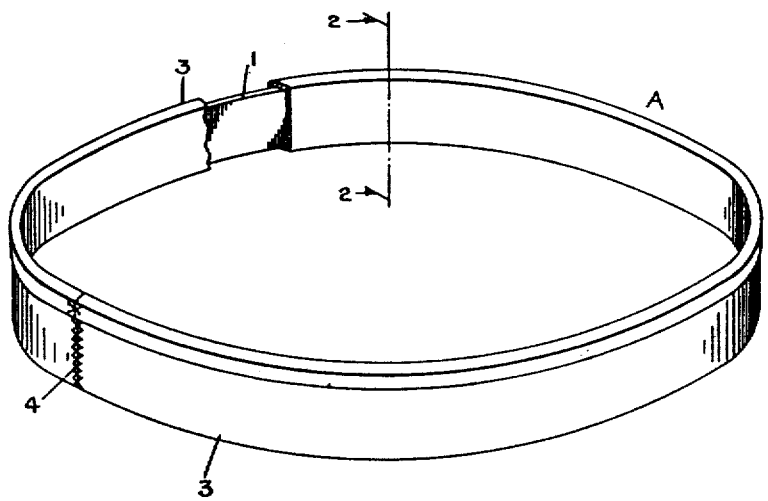

Fig. 1

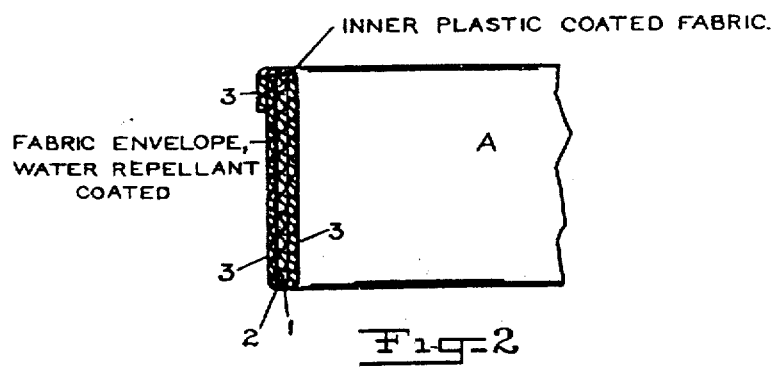

Fig. 2

INVENTOR.

LOUIS GLASS.

BY

ATTORNEYS

In the heading to the printed specification, line 6, strike out the words and period "No Drawing."; page 2, second column, line 75, after "fabric."

CERTIFICATE OF CORRECTION.

Patent No. 2,343,408.  March 7, 1944.

LOUIS GLASS.

--In the accompanying drawing which serves to illustrate my invention,

Figure 1:
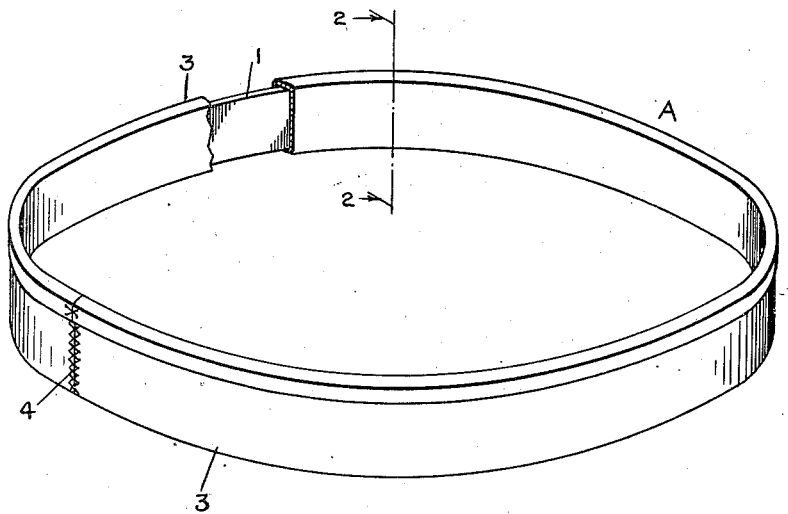
Figure 1 is a perspective view of a hat band with parts broken away.
Figure 2:
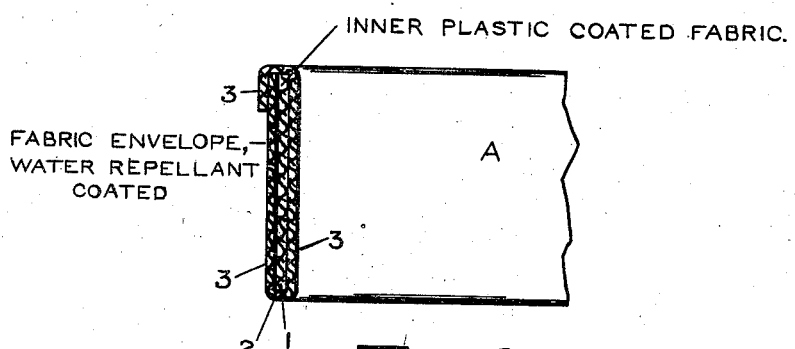
Figure 2 is a cross-sectional view along the line 2-2 of Figure 1.

In the drawing, the hat band A comprises an inner layer of fabric 1, coated on one side thereof with a thermoplastic composition 2. The fabric 1 is inserted into an outer fabric 3, which is in the form of an envelope, said outer fabric being coated with a water-repellant composition. The ends of the outer fabric envelope are joined at 4, by sewing or any other suitable manner. --;

and that the said Letters Patent should be read with this correction therein that the same may conform to the record of the case in the Patent Office.

Signed and sealed this 30th day of May, A. D. 1944.

Leslie Frazer

(Seal) Acting Commissioner of Patents.